D. MORRIS.
Rotary Harrow.
No. 60,776.
Patented Jan. 1, 1867.
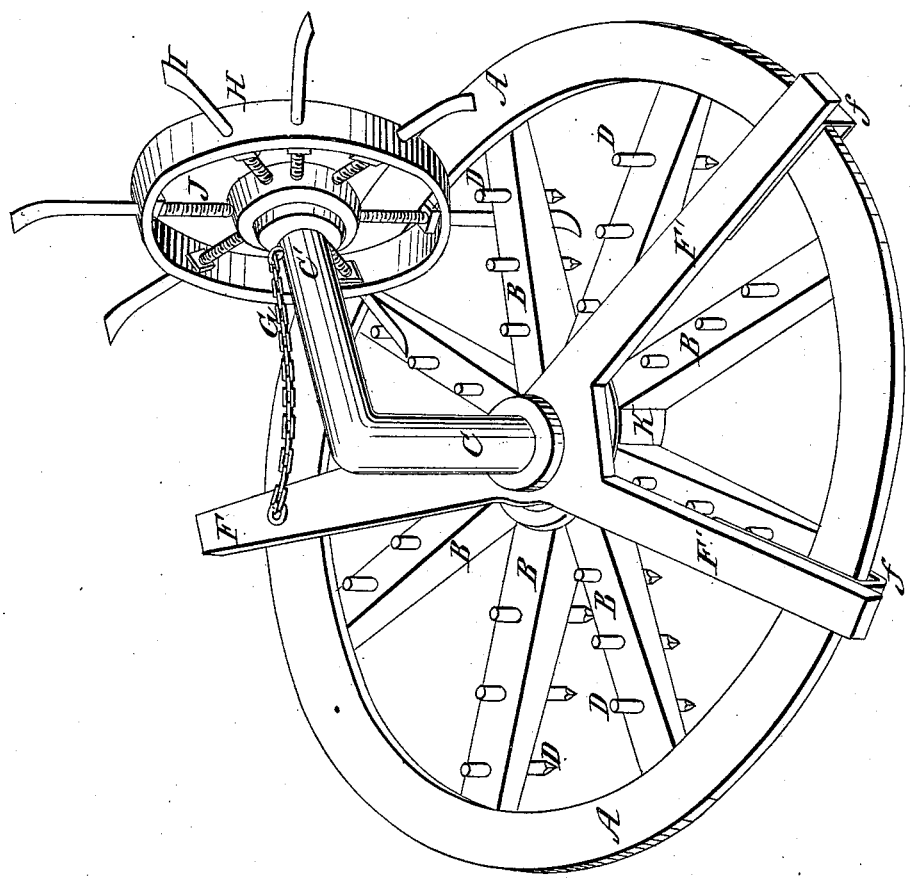
Witnesses:
Edward H. Knight
Solon C. Kemon
Inventor:
David Morris.
per Munn & Co. O.K. Supt
Attys

United States Patent Office.

DAVID MORRIS, OF BARTLETT, OHIO.

Letters Patent No. 60,776, dated January 1, 1867.

---

IMPROVEMENT IN ROTARY HARROW.

---

*The Schedule referred to in these Letters Patent and making part of the same.*

---

TO ALL WHOM IT MAY CONCERN:

Be it known that I, DAVID MORRIS, of Bartlett, in the county of Washington, and State of Ohio, have invented a new and improved Rotary Harrow; and I do hereby declare the following to be a full, clear, and exact description of the same, sufficient to enable one skilled in the art, to which the invention appertains, to make use of it, reference being had to the accompanying drawings, which form a part of this specification, and in which my invention is represented by a perspective view.

In the centre of the harrow is a post on which the harrow turns; at a point above the harrow, the post is bent to an angle of 90°, and upon its end is a spade-wheel, which revolves in a vertical plane, the spades striking into the ground between the spokes of the harrow, and, by arresting the spokes, causing the harrow to turn; the position of the bent arm is maintained by a chain from the draught-pole.

In the drawings, A is the rim of the harrow, connected by spokes B with the hub K, which is journalled on the foot of the post C. D D are the teeth of the harrow, and F F' the frame by which it is drawn and guided, the irons $ff$ hooking under the edge of the rim. The post C is bent and forms an elbow, C', which is attached by the chain G to the draught-pole F, and carries the spade-wheel H, which revolves by the contact of its spades or spikes with the ground. These spades are the same in number as the spokes, and are of such a length as to penetrate sufficiently far into the soil to maintain their position when a spoke strikes them, as the harrow is drawn along. They can be adjusted as to length by the screw-shanks J and the set-nuts thereon.

Its operation is as follows: The harrow being drawn by the pole F, a spade comes in contact with the soil, and the spoke behind it is drawn against it; the spade maintaining its position relatively, the harrow is rotated and that spade is lifted by the rotation of the spade-wheel, another taking position in front of the next spoke. The action upon the ground is much more thorough than that of a mere drag harrow, as all the action of the teeth is not parallel and in the direction of the draught.

Having described my invention, what I claim as new therein, and desire to secure by Letters Patent, is—

The rotary harrow, having a bent post upon which a spade-wheel is so journalled that the spades, by contact with the soil, shall arrest the spokes and rotate the harrow without the intervention of gearing, substantially as described.

DAVID MORRIS.

Witnesses:
   WILLIAM HOBSON,
   STEPHEN HOBSON.